United States Patent
Eckert et al.

(10) Patent No.: US 6,386,019 B1
(45) Date of Patent: May 14, 2002

(54) METHOD AND DEVICE FOR DETECTING AN EXTERNALLY CAUSED VARIABLE DRIVING OR BRAKING A VEHICLE, ESPECIALLY SUCH A MOMENT

(75) Inventors: Alfred Eckert, Mainz; Jürgen Diebold, Eschborn, both of (DE)

(73) Assignee: Continental Teves AG & Co., oHG, Frankfurt (DE)

( * ) Notice: Subject to any disclaimer, the term of this patent is extended or adjusted under 35 U.S.C. 154(b) by 0 days.

(21) Appl. No.: 09/529,432

(22) PCT Filed: Oct. 16, 1998

(86) PCT No.: PCT/EP98/06565

§ 371 Date: Jul. 26, 2000

§ 102(e) Date: Jul. 26, 2000

(87) PCT Pub. No.: WO99/20922

PCT Pub. Date: Apr. 29, 1999

(30) Foreign Application Priority Data

Oct. 17, 1997 (DE) .......................................... 197 45 958
Jan. 20, 1998 (DE) .......................................... 198 02 216

(51) Int. Cl.⁷ ............................................. G01M 15/00
(52) U.S. Cl. ..................................................... 73/117.3
(58) Field of Search .......................... 73/116, 121, 129, 73/117.3; 364/424.1; 479/118; 340/438; 701/101–105; 477/118, 47

(56) References Cited

U.S. PATENT DOCUMENTS

| 3,808,882 A | 5/1974 | Nick et al. |
| 3,905,223 A | 9/1975 | Ludloff |
| 5,241,855 A | 9/1993 | Cullen et al. |
| 5,455,767 A | * 10/1995 | Staerker .................. 364/424.1 |
| 5,514,050 A | * 5/1996 | Bauerle et al. ............. 479/118 |

FOREIGN PATENT DOCUMENTS

| DE | 41 38 822 | 5/1992 |
| DE | 43 28 893 | 3/1994 |
| DE | 43 38 587 | 5/1994 |
| DE | 196 12 455 | 10/1997 |
| DE | 196 21 671 | 12/1997 |
| DE | 196 32 337 | 2/1998 |
| EP | 0 142 633 | 5/1985 |
| EP | 0 430 028 | 6/1991 |
| EP | 0 716 000 | 6/1996 |

OTHER PUBLICATIONS

Search Report of the German Patent Office for Application No. 198 02 216.6.

(List continued on next page.)

*Primary Examiner*—Benjamin R. Fuller
*Assistant Examiner*—Maurice Stevens
(74) *Attorney, Agent, or Firm*—Rader, Fishman & Grauer PLLC

(57) ABSTRACT

A method is described for determining an externally produced value, especially a momentum, accelerating or decelerating the vehicle, with the following steps: determination of the driving performance of the vehicle on the basis of a model, comparison of the model output values with the relative measuring values or values derived from this, and determination of the externally produced value according to the result of the comparison. The corresponding device includes a model of the driving performance of the vehicle, a comparator for model output values and measuring values or values derived from these and a device for determining the externally produced value according to the result of the comparison.

13 Claims, 3 Drawing Sheets

OTHER PUBLICATIONS

Alles et al.: "The Hardware Design of a Real–Time HITL for Traction Assist Simulation" IEEE Transactions On Vehicular Technology, vol. 44, No. 3, p. 668–681 (1995).

Zanten et al.: "Die Fahrdynamikregelung von Bosch", AT–Automatizierungstechnik, vol. 44, No. 7, p. 359–365 (1996).

Germann et al.: "Modellgestützte Verfahren zur parameteradaptiven Regelung der Fahrzeuglängsdynamik", AT–Automatisierungstechnik, vol. 45, No. 2, p. 84–92 (1997).

Voit et al.: "Modellbasierter Entwurf einer neuen ABS–Regelung mit Bremsmomentensensor", AT–Automatisierungstechnik, vol. 44, No. 5, p. 201–207 (1996).

* cited by examiner

METHOD AND DEVICE FOR DETECTING AN EXTERNALLY CAUSED VARIABLE DRIVING OR BRAKING A VEHICLE, ESPECIALLY SUCH A MOMENT

TECHNICAL FIELD

The present invention generally relates to vehicle stability control and more particularly relates to a method and a device for establishing a value, especially a momentum, produced externally, driving or braking a vehicle.

BACKGROUND OF THE INVENTION

The longitudinal dynamics of a vehicle—speed and acceleration—is influenced by various internal and external values, especially momentums. Within the meaning of this description, internal values/momentums are the motor torque, the brake torque or the normal resistance (which can be described internally by tables based on pragmatic values or by constants or formulas considering the motional status of the vehicle in connection with the characteristics/parameters of the vehicle). These values can be established in a relatively precise manner by various measures so that it is possible to consider their influence on the longitudinal dynamics. Additionally there are also externally produced values resulting particularly variable in addition to the normal resistance described above (which can be described internally). This includes, e.g. the slope descending force when a vehicle is driving on an inclined road. This slope descending force leads to a momentum which influences the longitudinal dynamics of the vehicle. The same applies for wind forces, extraordinary rolling resistances or similar. It is not possible (or only with difficulties) to establish these externally produced values with traditional sensors, so that usually additional sensors are required which have to be eliminated.

However, for some applications it is desirable to know also externally produced values driving or braking a vehicle, especially momentums. An example for such an application would be a starting aid when driving up a hill. Such starting aids shall facilitate the complicated handling of brake, parking brake, clutch and motor. At the same time it has to be assured that the vehicle never rolls back, in order do avoid e.g. collisions with vehicles being parked in downhill direction. If a vehicle shall be started driving up the hill, the rules described schematically in FIG. 4 apply in a first approximation. The weight $F_G$ of the vehicle can be decomposed into a normal component $F_N$ and a tangential component $F_T$ on the wheel of a one-wheel model. Together with the wheel radius $r_R$, $F_T$ leads to a slope descending momentum $M_H$ according to the formula:

$$M_H = F_G \cdot \sin \alpha \cdot r_R$$

In this case $\alpha$ is the angle of inclination. Without further intervention the slope descending momentum $M_H$ would cause the vehicle to run down the hill. The brake torque $M_B$ and the motor torque $M_M$ introduced during the start of the vehicle, counteract against this momentum. An aid for starting up the hill can influence, e.g. the brake torque $M_B$. But the influence has to be such to assure at all times that the inequation $$M_H < M_B + M_M$$

is complied with because only in this case the vehicle is definitely prevented from rolling back. In order to satisfy the equation mentioned above, the slope descending moment has to be known.

Similar considerations as above apply in dynamic situations (vehicle speed unlike zero). When driving slowly up the hill in urban traffic, the considerations mentioned above could become an important factor. Also in such cases it is desirable to know the values produced externally and driving or braking a vehicle, especially momentums, in order to influence the vehicle in an adequate manner.

From U.S. Pat. No. 5,455,767 a control for a vehicle drive with an automatic gear is known which determines a correction term by comparing an estimated and a measured output speed representing a basic value for the inclination angle. On the input side a motor torque and a resistance momentum of the vehicle are delivered to a time element. The difference between the estimated and the measured output speed is countercoupled to the rotation angle acceleration.

It is the object of the present invention to indicate a method and a device for establishing an externally produced value, especially such a momentum, which drives and brakes the vehicle.

The externally produced values, and in particular the momentums, are determined by an observer. The observer receives internally produced values, especially momentums, which drive or brake the vehicle, establishes, how the longitudinal dynamics of the vehicle should develop, compares this result with the measured values of the longitudinal dynamics and concludes from possible deviations that there are externally produced values, especially momentums, driving or braking a vehicle.

DETAILED DESCRIPTION OF THE PREFERRED EMBODIMENTS

Figure 1:
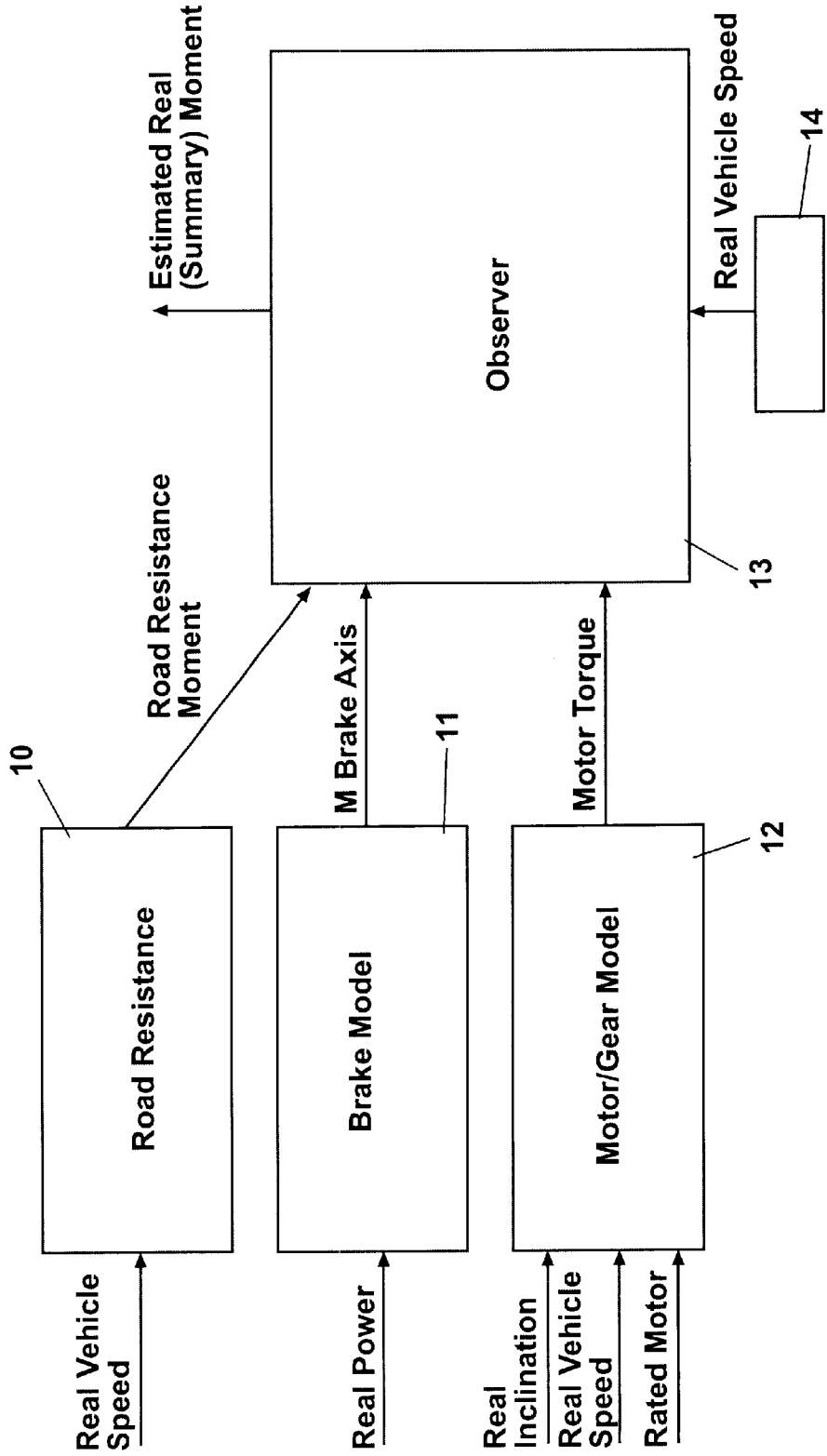
FIG. 1 a block diagram of the present invention

FIG. 1 schematically describes a first embodiment according to the present invention. The devices 10 to 12 are devices for determining internal or internally produced momentums. In particular a device 12 for determining the motor torque MMotAxis and a device 11 for determining the brake moment MBrakeAxis can be foreseen. In addition, also a device 10 for determining a normal resistance MNormalRes can be foreseen. On the other hand, the devices 10 to 12 work according to certain input values. The devices 11 and 12 can particularly be models and/or tables which model or describe the conduct of the brake and/or the motor/gear and deliver the desired output values.

On the basis of a model and with reference to the input values described above, the observer 13 determines the "theoretical" driving performance or the "theoretical" longitudinal dynamics, particularly the speed, of the vehicle, based on characteristic values even in this case. Characteristic values are, e.g. the tire radius or the vehicle mass. Furthermore the observer 13 receives a theoretical value from an appropriate device 14 which corresponds to the measured value. If the modeling of the longitudinal dynamics is sufficiently precise, the deviation between the theoretical and the measured value can be attributed to values, especially momentums, produced externally and not modeled, so that this external value can be concluded from this deviation.

Figure 2:
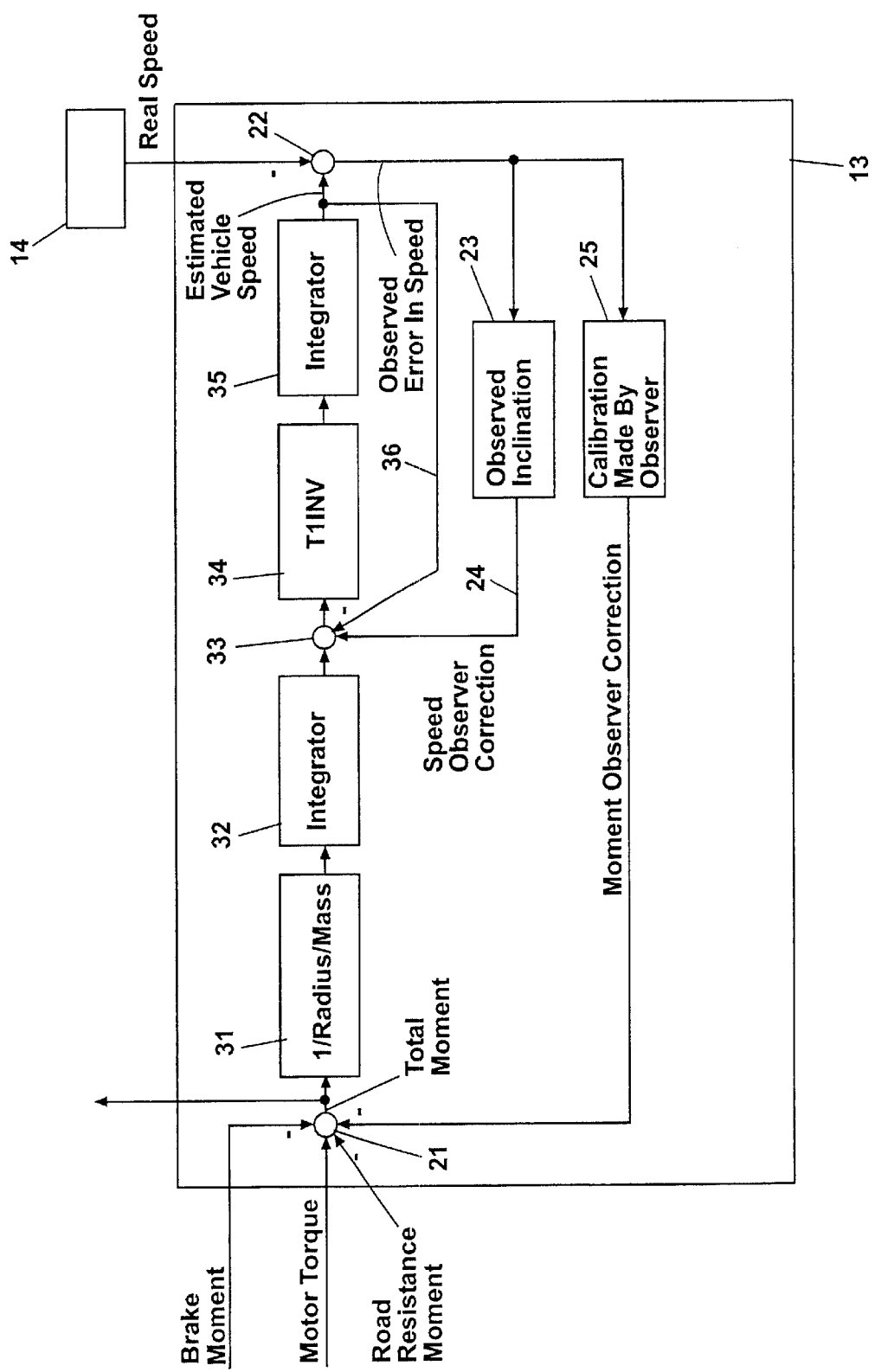
FIG. 2 the observer of FIG. 1

FIG. 2 shows the observer 13 of FIG. 1 in a more precise representation. The observer 13 represents a model of the driving performance response the longitudinal dynamics of the vehicle, corresponding to the numerals 31 to 36. Furthermore it shows a device for determining the external value, i.e. the numerals 21, 22, 25. But before illustrating the function of observer 13 on the basis of FIG. 2, the model of the driving performance response the longitudinal dynamics of the vehicle is described on the basis of FIG. 3 which represents again the components 31 to 36 of FIG. 2 for illustration.

The model for the driving performance of the vehicle response for its longitudinal dynamics has to meet at least two conditions in order to be suitable for the present invention.

it must have suitable input and output values and it must consider static and dynamic effects in a sufficiently precise manner.

Figure 3:
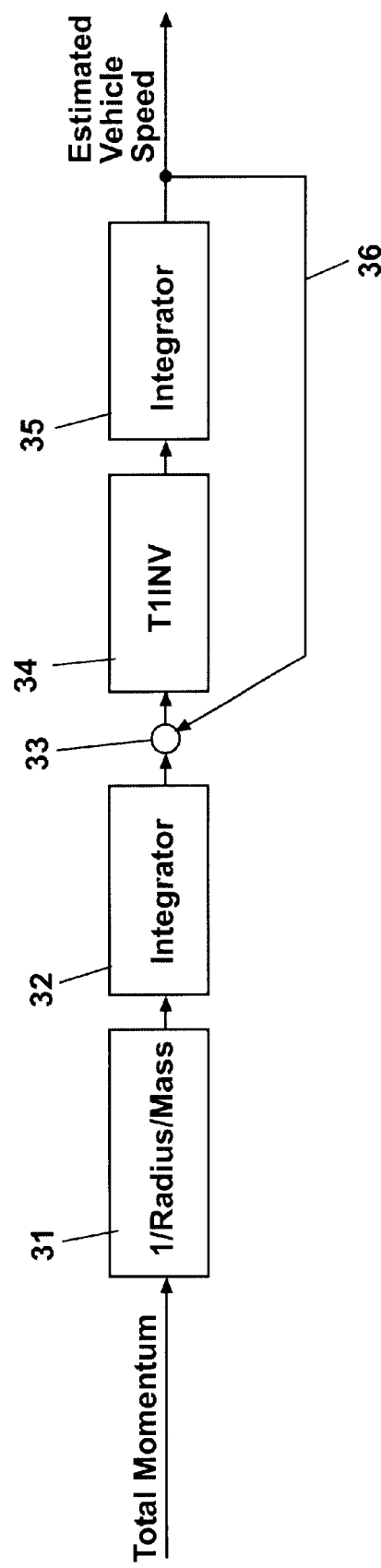
FIG. 3 an exemplary model of the vehicle dynamics.
Figure 4:
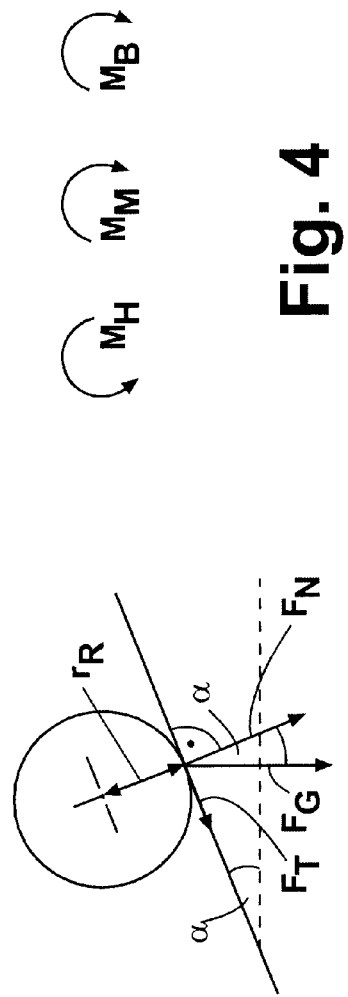
FIG. 4 schematically valid physical connections in an exemplary application.

The model in FIG. 3 satisfies these requirements. As input values it receives a total momentum which acts on the vehicle. This total momentum MTot corresponds to the total of all accelerating and decelerating momentums. If the total momentum MTot is zero, the vehicle will drive at a constant speed. If it is greater than zero, the vehicle will be accelerated, if it is negative, the vehicle will be decelerated. In the calibration 31 the total momentum is calibrated according to wheel radius and vehicle mass. In this case "calibration" is a proportional conversion serving e.g. for the conversion, normalization or adaptation of values. From this results a value corresponding to the acceleration. This value is integrated in integrator 32. Thus results a value corresponding to a speed. Furthermore an assembly 33 to 36 is foreseen which imitates the dynamics. In the represented embodiment of the present invention this refers to a $PT_1$-member which only gradually communicates to the output changes occurring on the input. The $PT_1$-member includes a subtractor 33, a calibration 34, an integrator 35 and a feedback 36 introduced at the subtractor 33. The value of the calibration 34 defines the time constant of the $PT_1$-member. The $PT_1$-member considers the fact that real systems react practically always with a certain delay to changes of their input values. Thus it is possible to better imitate the vehicle dynamics. The result is an output in the form of a speed VMod, which the model in FIG. 3 has determined as "theoretical" speed of the vehicle on the basis of the total momentum MTot which had been inserted.

The sequence of the single components can also be represented in a different way than that of FIG. 3. However, the negative feedback 23, 24 of FIG. 2 should be introduced after the integrator 32. The device 14 for determining the real vehicle speed VRefFilt can be a sensor emitting an adequate signal. A more complex device can also be foreseen, taking suitable judgement and filtering measures in order to receive signals which are possibly free from interferences.

The vehicle model described with reference to FIG. 3 can be considered as an example. However, also other models can be used which satisfy the requirements mentioned further above.

Referring again to FIG. 2, the use of the model of FIG. 3 in the observer 13 is illustrated. The "theoretical" vehicle speed VMod determined on the basis of the model is compared with the real vehicle speed VRefFilt. In particular the difference between the model speed (also called estimated vehicle speed) and the real speed (also called real vehicle speed) VRefFilt is built in the subtractor 22. The deviation between estimated vehicle speed and real vehicle speed has to be attributed to externally produced values, and especially momentums, which are not modeled, and thus permits a conclusion to be made with regard to these external values and especially momentums. If the vehicle is running uphill, the externally produced momentum has a decelerating effect. Without considering this external momentum the estimated speed would be too high and particularly higher than the real vehicle speed. If the vehicle is running downhill, the slope descending momentum has an accelerating effect. Without considering this slope descending momentum the estimated vehicle speed VMod would thus be smaller than the real vehicle speed VRefFilt. Thus, from the deviation and in particular from the difference between the estimated and the real vehicle speed can be determined the externally produced value, in particular the externally produced momentum. In order to cause the observer 13 to work altogether in a stable manner, the external momentum already determined can be added with the right algebraic signs to the other momentums already determined (of the devices 10 to 12). For this reason it is introduced at the summation point 21. The device 25 is a calibration which converts the speed difference into the relative momentum errors preferably in a proportional manner. Thus the output of the device 25, the signal MCorrectionObs is the externally produced momentum that had originally been looked for, which can be used as output signal and can be led back into the observer at the summation point 21, as already mentioned above.

From the point of view of the control technique also a feedback 23, 24 can be foreseen which, after the integrator, leads back a signal into the vehicle model corresponding to the difference between the estimated vehicle speed and the real vehicle speed. Thus stability and dynamic characteristics of the model are improved. The countercoupling feedback can be realized e.g. at summation point 33.

The device according to the present invention can be implemented by discrete components, but also be formed by means of a suitably programmed computer which receives the relative input values, sends the desired output values and has access to the data which are also needed. The Method is executed preferably in a continuous manner or triggered periodically.

What is claimed is:

1. Method for determining an externally produced value indicative of a force which accelerates or decelerates a vehicle, said vehicle including a vehicle speed sensor, comprising the steps of:

determining an internal motor torque that is accelerating the vehicle, determining at least one of a motor and brake torque that is decelerating the vehicle, determining an estimated vehicle speed from a total momentum defined by at least one of motor torque and brake torque, determining a real vehicle speed on the basis of measured values derived from said vehicle speed sensor, determining an externally produced momentum value according to the real and the estimated vehicle speed and feedback of the externally produced momentum value, and determining the total momentum.

2. Method according to claim 1, wherein the step of determining the estimated vehicle speed further includes the steps of adding the accelerating or decelerating momentums with correct algebraic signs, the calibration of the sum according to the vehicle mass and the wheel radius, and integration of the calibrated value.

3. Method according to claim 1, wherein the externally produced momentum value, is determined according to the difference between the real and the estimated vehicle speed.

4. Method according to claim 3, further including integrating at least one of the motor torque and brake torque decelerating the vehicle.

5. Method according to claim 4, further including the step of counter coupling the integrated value with the calibrated difference between the real and the estimated vehicle speed.

6. Method according to claim 1, further including the step of determining the estimated vehicle speed according to the motor torque, the brake torque and a normal resistance.

7. Device for determining an externally produced value accelerating or decelerating the vehicle, comprising:

a first determining device for determining internal motor torques accelerating the vehicle, and motor torque, and brake torque decelerating the vehicle, an observer for determining an estimated vehicle speed on the basis of a total momentum defined by at least one of the motor torque and brake torque, a sensor for determining of the real vehicle speed on the basis of measured values, a second determining device for determining externally produced momentum values according to the real and the estimated vehicle speed, and a third determining device for determining or correcting the total momentum.

8. Device of claim 7, wherein the estimated vehicle speed is determined, at least in part, based on motor torque, brake torque, and normal resistance.

9. Device according to claim 8, wherein the first determining device includes a device for determining a normal resistance, a device for determining a brake torque and a device for determining a motor torque.

10. Device according to claim 7, wherein the observer includes:

an adder for summing up momentums with the correct algebraic signs which accelerate or decelerate the vehicle, a calibrator for calibrating the adder output according to the vehicle mass and the wheel radius, and an integrator for integrating the calibrator output.

11. Device according to claim 10, wherein the sensor includes a decelerating member of first degree, downstream the integrator.

12. Device according to claim 11, further including a countercoupling of the calibrated difference between the real and the estimated vehicle speed for the output of the integrator.

13. Device according to claim 7, wherein the second determining device includes a subtractor forming the difference between the real and the estimated vehicle speed.

* * * * *